Dec. 13, 1949          J. I. YELLOTT          2,491,435
              GAS TURBINE EXHAUST STEAM GENERATOR
                    Original Filed Aug. 17, 1946
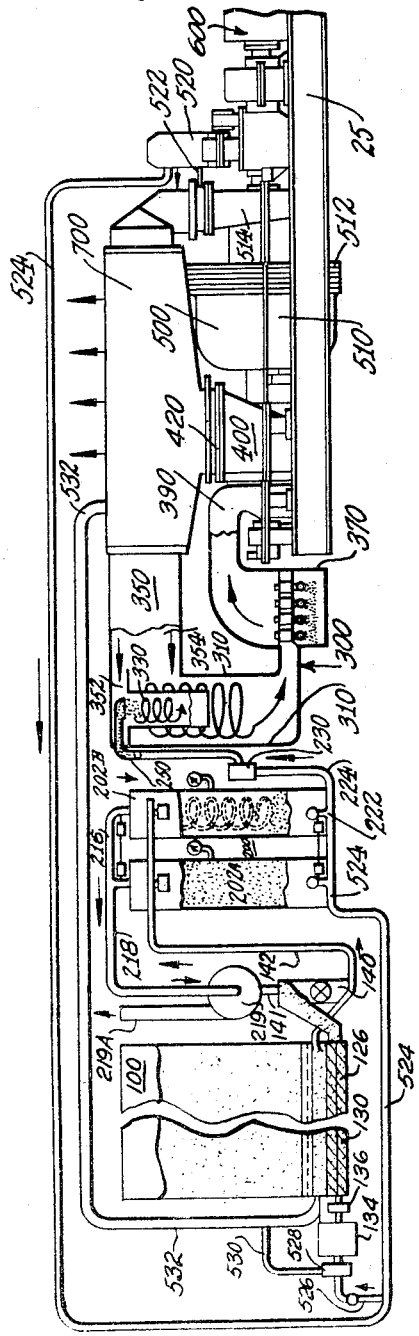
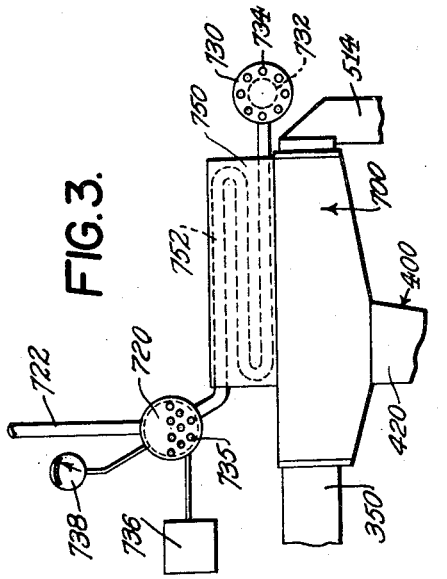
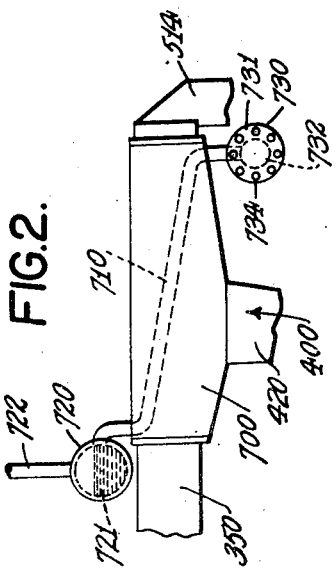
INVENTOR.
JOHN I. YELLOTT
BY
Frederick Griswold, Jr.
ATTORNEY Patented Dec. 13, 1949

2,491,435

UNITED STATES PATENT OFFICE 2,491,435

GAS TURBINE EXHAUST STEAM GENERATOR

John I. Yellott, Cockeysville, Md., assignor to Bituminous Coal Research, Inc., Washington, D. C., a corporation of Delaware Original application August 17, 1946, Serial No. 691,307. Divided and this application August 6, 1947, Serial No. 766,754

7 Claims. (Cl. 237—12.4)

This invention relates to improvements in power systems, and more particularly, to a coal-fired gas turbine power plant incorporating hot water and steam generating equipment heated by the waste heat of the hot motive gases discharged from the turbine exhaust.

This application is a division of my application Serial No. 691,307, filed August 17, 1946.

A feature of novelty and advantage of the invention is to provide a special coal burning power plant incorporating a gas turbine and associating a waste heat recovery system with the turbine exhaust, which system includes steam and hot water generating equipment which is adapted, in locomotives for train heating services, and in stationary power plants for generation of hot water and process steam.

The above and other desirable features of novelty and advantage of the present invention will be described with more particular reference to a power plant incorporating pressurized, pulverized coal-burning combustors for supplying fly-ash-free motive gases to a gas turbine.

In the system herein, the initially crushed coal is stored in hoppers or other containers and fed in a pressurized flowing stream through an atomizer wherein it is subjected to a pressure drop and is pulverized, the pulverized stream being burned, at a lower pressure, in the flame tube of a combustor. The products of combustion of the flame tube are diluted with compressed heated air from the main compressor, which air has been passed through a regenerator mounted in the turbine exhaust stack. Because of the amount of heat available in the exhaust gas issuing from the stack at temperatures ranging from 400 to 800° F., a sufficient quantity of energy is available for generating additional power as process steam or hot water. It is to be noted that in the case of locomotives, the power, in B. t. u.'s, required for train heating and auxiliary services is only slightly less than that required to operate a train. The coal-fired gas turbine power units of the parent application hereinabove identified are characterized by the fact that the waste stack heat from a coal-fired gas turbine power plant is more than sufficient to operate the auxiliary train services, including hot water and steam equipment which are desirably generated in boilers mounted in the exhaust stack.

Flowing from these considerations, the auxiliary heating and power system herein will be characterized by low operating costs and the fact that because the gas turbine produces substantially half again as much power in winter as it produces in summer, without added equipment or operative features, the extra train heating and hot water and steam services required of passenger locomotive equipment in winter will be automatically taken care of without requiring any extra equipment or controls.

The above and other desirable features of novelty and advantage of the present invention will be described in the accompanying specification, certain preferred forms of equipment being illustrated in the drawings, by way of example only, for, since the underlying principles may be incorporated in other power-generating equipment, it is not intended to be limited to the forms here shown, except as such limitations are clearly imposed by the appended claims.

In the drawings, like numerals refer to similar parts throughout the several views, of which Fig. 1 is a diagrammatic showing of a gas turbine power plant with the combustor shown in vertical section; and Figs. 2 and 3 are perspective showings, partly in broken section, of generator units of hot water and steam generators for train services.

The waste heat recovery system herein will be described more particularly with reference to a coal-fired gas turbine power unit incorporating a main, or first, low pressure air compressor and regenerator, together with a second, high pressure compressor feeding a special high pressure air system for conveying crushed coal from storage tanks through a pneumatic pulverizer to a combustor where the fuel is combusted and the products of combustion are diluted with a major proportion of cooling air, derived from the main compressor, to cool the same down to a temperature of the order of 1300° F., to form a motive fluid which is discharged through the turbine, doing work, and is vented to the atmosphere through the exhaust stack at temperatures varying from 300° F. to 700° F.

Because of the special problems of a gas turbine system, the air compressor and regenerator will be first described, along with the special high pressure air system and the novel waste heat boilers of the present invention as associated with the regenerator mounted on the exhaust stack of the turbine.

Air compressor and regenerator

The feature of the present invention embodying the conveying of crushed coal by heated air is of maximum importance as it is used for the simultaneous drying and transferring of the initially crushed coal from the crusher to the pressure hoppers, and from the latter to the combustor. The waste heat of the system may be utilized in various service units including train heating boilers and the like, as will be described more in detail herein.

The air compressor system of the present invention is essentially comprised as follows:

As shown in Fig. 1, an axial air compressor 500 is provided with an air inlet casing or scroll and air intake silencers 512, and is driven by the shaft of gas turbine 400. This main, low pressure (75 lbs. per square inch), compressor discharges through duct 514, regenerator 700, and air duct 350, to the combustor 300. As shown, a second, high pressure compressor 520, is driven, through suitable gearing, by the turbine shaft, and is provided with intake pipe 522 connecting with the outlet duct 514 of the main compressor 500. This high pressure compressor is provided with a discharge line 524 which connects directly with the pressurized solids feed line 224 to the combustor 300. The line 224 is essentially a continuation of line 524. Crushed coal, from the pressure storage chambers 200, is fed into feed line 224, at its junction with line 524, by pressure transfer means, indicated generally at 222.

The main compressor 500 delivers the main charge of cooling and diluting air to duct 514, regenerator 700, and duct 350 into combustor 300. The heated air which has been regeneratively heated by the turbine exhaust gases, mixes with and dilutes and cools the products of combustion to form a turbine motive fluid. This gaseous fluid passes through the turbine, doing work and is discharged through turbine exhaust stack 420 in heat exchanging relation with the low pressure air ducts or tubes mounted in the regenerator, thence out to the atmosphere, a certain portion thereof being withdrawn from the turbine exhaust duct 420, through pipe 532 and delivered to the coal bunker 100, to dry the coal, as claimed in my parent application. The pipe 532 is connected to the discharge trough 126 of bunker 100, and thence through line 142 to the crushed coal containers 200 (Fig. 1). Air motor 528 exhausts through line 530 into line 532. This motor drives screw feeder 130, in bunker trough 126, through gear box 134 and coupling 136. As shown in my parent application (Fig. 11), a branch of waste hot air line 532 can be connected directly to crusher and dryer 140, in addition to having the main waste hot air line discharging directly into the bunker trough housing the feeder screw.

*Air system*

In the pressure tank system 200, the waste hot air is separated from the entrained air-borne 16-mesh fuel, and is discharged to the atmosphere through vents 213 and line 218 by means of suction fan 219. The high pressure compressor 520 is adapted to deliver air at higher compression than main compressor 500. This high compression air is delivered, as a side stream, from line 524 to the bunker trough 130 and crusher 140, the main pressure air stream being delivered to the pressurized solids feed line 224 into which crushed coal is introduced through outlets 222 of the pressure feeders 200. Line 224, discharges air-borne, fluidized coal solids through flash or pneumatic pulverizer 230, with a drop in pressure, and resultant pulverization of the entrained solids, and line 250 to the burner of combustor 300.

Considering the general operation of the system, and with particular reference to the air system, and the combustion system, it is to be noted that air compressed to 75 p. s. i. a. and heated to 1300° F., drives the turbine. It is noted further that the primary, high-pressure combustive air required for the pneumatic or flash pulverization of the initially crushed coal is provided by a second, high pressure compressor. The waste heat from the turbine exhaust gases which have been in heat exchanging contact with the secondary air heating elements in the regenerator is utilized for generating train heating steam and for other services. Waste hot air from the turbine exhaust duct 420 will be delivered to the discharge trough of the coal bunker, serving to dry the coal. A suction fan is provided for drawing the coal, discharged to crusher 140, through the crusher and drying the same, as well as conveying the crushed and dried coal into the pressure storage chambers where the air is separated from the entrained particles and vented to the atmosphere. Primary combustion air from the high pressure compressor, at 140 p. s. i., serves to transport the ground coal from the storage chambers 202A, 202B, to the pneumatic pulverizer 230, wherein the pressure drop across the throat of the convergent nozzle of the pulverizer is of the order of 65 p. s. i. with resulting flash pulverization of the coal, which is immediately burned in its pressurized stream of carrying air, in a special, pressurized combustion chamber 300. The products of combustion are diluted with excess air from the main compressor 500, which has been regeneratively heated in regenerator 700, to reduce the temperature to 1300° F., and the resulting motive fluid is used to drive the turbine. Because of the pneumatic pulverization feature of the flash pulverizer, coupled with the use of the vortex type of combustor, a heat release in excess of 1,500,000 B. t. u. per hour per cubic foot is attained.

*Train heating services*

The hot, expanded products of combustion are delivered from the turbine to the turbine exhaust, in heat exchanging relation with the compressed air carrying ducts of the regenerator 700 at a relatively high temperature. The turbine exhaust gases are vented to the atmosphere at temperatures varying from 300° F. to 700° F. Because of the very sensible quantities of heat available, steam for train heating, or process requirements, can be generated in waste heat boilers mounted in the turbine exhaust duct with the regenerator. In Figs. 2 and 3, there are shown two systems for generating steam and hot water for train heating services.

In the form shown in Fig. 2, a bank of boiler tubes, indicated generally, in dotted line showing, at 710 is arranged in the turbine exhaust duct with the regenerator 700, and at an angle, as shown. The convection tubes 710 are connected between an upper header 720 and a lower header 730. The header 720 is provided with an outlet pipe 722 suitably connected to the train heating services. The lower drum 730, as shown, is of the Scotch boiler type, and is provided with an inner combustion chamber 732 which serves for burning of liquid or gaseous fuel. A group of internal, radially disposed electrical heating elements 734 can be disposed in the chamber 731, as shown. The chamber 731, formed between the inner and outer drums 732 and 730, is in communication with the upper drum 720, the level of the body of liquid in the system being indicated at 721. Under conditions of normal operation, that is when the gas turbine is functioning, the exhaust gases from the turbine 400, as delivered into and through the exhaust stack in heat-exchanging relation with the regenerator 700, will not only preheat the compressed air from the main compressor, and delivered to conduit 350 leading to the combustor, but will supply more than enough additional heat to generate steam in convection tubes 710. This steam collects in header 720, and is delivered through line 722 to the train heating system. For stand-by use, including emergency conditions when a train is stalled during cold weather, or the gas turbine is not functioning, the lower drum may be heated, either electrically, by the heating elements 734, or by flame in the inner chamber 732, where liquid fuel can be burned.

With the arrangement shown, a complete stand-by train heating service is made possible as an adjunct to the normal operation of such a system from waste heat derived from turbine exhaust gases. The liquid fuel required for the stand-by operation of the unit, as a furnace-heated assembly will require but a minimum of space compared with the steam-heating equipment of the standard steam locomotive. While the auxiliary heating elements, both electrical and flame, have been shown as incorporated in the lower drum 730, it will, of course, be understood, that these elements may be incorporated in the upper drum 720. In any event, the train-heating services can be taken care of, according to the present system, with a minimum of equipment, and without requiring extra space. It will also be appreciated that under certain conditions of operation, as on down-grade runs, and the like, the train motors powering the driving wheels of the locomotive, can be operated as generators, and the power developed, utilized, at least in part, for the auxiliary heating described immediately above.

In the system shown in Fig. 3, a separate waste heat boiler 750 is mounted on and over the turbine exhaust stack housing regenerator 700, and is provided with suitable tubing or convection heating tubes 752. The upper drum 720 is provided with the usual steam take-off pipe 722, and the lower drum 730, as shown, is provided with a central heating chamber or flame tube 732, and internal electrical heating elements 734. The drum 720 may be provided with electrical heating elements 735. An automatic control device 736 may be suitably connected to a pressure gauge 738 to control the operation of these important auxiliaries. Thus, if pressure in line 722 drops, due to cessation of operation of the turbine, the direct-fired furnace may be automatically cut into operation. Similarly, the automatic control may be so arranged as to cut the electric heating elements into the generator circuits under conditions such as noted above. The auxiliary heating system is extremely simple and effective, yet without requiring special installations and complex equipment.

Various modifications will occur to those skilled in the art in the composition, configuration and disposition of the component elements going to make up the invention as a whole as well as in the selection and combination of particular features for specific purposes, and no limitation is intended by the phraseology in the foregoing description or illustrations in the accompanying drawings except as indicated in the appended claims.

What is claimed is:

1. In a generating electric locomotive powered by a coal-fired gas turbine and including a turbine and a generator driven by the turbine, a source of heated motive gases for the turbine including a first, low pressure compressor driven by the turbine, a second, high pressure compressor, a coal bunker, a coal crusher fed from the bunker, crushed coal storage means, a combustor, a crushed solids feed line from the coal storage means to the combustor and incorporating a pneumatic convergent nozzle pulverizer, pneumatic conduit means delivering high pressure air from the second compressor to the crushed solids feed line, pneumatic conduit means delivering low pressure air from the first compressor to the combustor, means delivering heated motive gases from the combustor to the turbine, the improvements comprising, a steam generator for train heating services comprising heater tubes mounted in the exhaust duct in heat exchanging relation with the turbine exhaust gases, upper and lower headers connected to the tubes, a steam discharge line from the upper header, and means for delivering turbine exhaust gases to the coal bunker, whereby to dry coal fed to the coal crusher.

2. A train heater according to claim 1 in which at least one header is provided with internal electrical heating elements, and at least one header incorporates a flash boiler for flame combustion.

3. Train heater according to claim 2 in which the electrical heating elements are powered by the driving motors of the locomotive when run as generators.

4. A train heating device according to claim 1 including convection heating tubes in the turbine exhaust duct, upper and lower headers connected to the tubes, auxiliary electrical heating elements and flame heating flash boiler elements in at least one of the headers; the said train heater being operated by turbine exhaust gases under normal running conditions, and using motor-generated electricity when the train is running down grades with the turbine throttled; the flame heater or flash boiler being operable under stand-by or stalled conditions; and automatic control means connected to the steam delivery line of the unit to automatically switch over to motor generator-heating, and flame-fired heating upon throttling down of the turbine when the train is operated under regenerative braking conditions, and when the train is stopped, respectively.

5. In a coal fired, gas turbine powered generating electric power plant, including a gas turbine and a generator driven by the turbine, a source of heated motive gases for the turbine including a first, low pressure compressor driven by the turbine, a second, high pressure compressor, a coal bunker, a coal crusher fed from the bunker, crushed coal storage means, a combustor, a crushed solids feed line from the coal storage means to the combustor and incorporating a pneumatic convergent nozzle pulverizer, pneumatic conduit means delivering high pressure air from the second compressor to the crushed solids feed line, pneumatic conduit means delivering low pressure air from the first compressor to the combustor, means delivering heated motive gases from the combustor to the turbine, and a turbine exhaust duct, the improvements comprising a boiler having upper and lower headers and heater tubes joining the headers, the said heater tubes being mounted in the exhaust duct in heat-exchanging relation with the turbine exhaust gases, auxiliary heating means in at least one of the headers, and means for delivering turbine exhaust gases to the coal bunker, whereby to dry coal fed to the coal crusher.

6. Gas turbine power plant according to claim 5, including auxiliary flame heating means in at least one of the headers.

7. Gas turbine power plant according to claim 5, including separate electric and flame heating means in at least one of the boiler headers.

JOHN I. YELLOTT.

REFERENCES CITED

The following references are of record in the file of this patent:

UNITED STATES PATENTS

| Number | Name | Date |
|---|---|---|
| 1,050,451 | Gilroy | Jan. 14, 1913 |
| 1,489,501 | Miner | Apr. 8, 1924 |
| 2,076,382 | Minton | Apr. 6, 1937 |
| 2,200,379 | Williams | May 14, 1940 |
| 2,223,953 | Davis | Dec. 3, 1940 |
| 2,262,699 | Pfenninger | Nov. 11, 1941 |